(12) United States Patent
Latour et al.

(10) Patent No.: US 8,306,367 B2
(45) Date of Patent: Nov. 6, 2012

(54) METHOD AND APPARATUS FOR MANAGING IMAGE-PROCESSING OPERATIONS

(75) Inventors: Pierre-Olivier Latour, Menlo Park, CA (US); Kevin Quennesson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1151 days.

(21) Appl. No.: 11/811,117

(22) Filed: Jun. 8, 2007

(65) Prior Publication Data

US 2008/0304770 A1    Dec. 11, 2008

(51) Int. Cl.
*G06K 9/60* (2006.01)
(52) U.S. Cl. ........ 382/305; 382/302; 382/167; 382/295; 382/296; 382/297; 382/298; 345/501; 345/557
(58) Field of Classification Search ............... 382/305, 382/294–298, 167, 302; 345/501, 557
See application file for complete search history.

(56) References Cited

U.S. PATENT DOCUMENTS

| | | | | |
|---|---|---|---|---|
| 5,448,372 A * | 9/1995 | Axman et al. | ............... | 386/201 |
| 6,137,534 A * | 10/2000 | Anderson | ............... | 348/222.1 |
| 6,289,115 B1 * | 9/2001 | Takeo | ............... | 382/130 |
| 6,388,732 B1 * | 5/2002 | Williams et al. | ............... | 355/40 |
| 6,421,429 B1 * | 7/2002 | Merritt et al. | ............... | 379/93.17 |
| 6,874,131 B2 * | 3/2005 | Blumberg | ............... | 715/205 |
| 7,015,915 B1 * | 3/2006 | Diard | ............... | 345/522 |
| 7,075,541 B2 * | 7/2006 | Diard | ............... | 345/505 |
| 7,236,960 B2 * | 6/2007 | Manico et al. | ............... | 705/500 |
| 7,565,441 B2 * | 7/2009 | Romanik et al. | ............... | 709/234 |
| 7,698,579 B2 * | 4/2010 | Hendry et al. | ............... | 713/300 |
| 7,792,389 B2 * | 9/2010 | Hoshino | ............... | 382/294 |
| 2003/0028537 A1 * | 2/2003 | Nakamura et al. | ............... | 707/10 |
| 2003/0115286 A1 * | 6/2003 | Mayle et al. | ............... | 709/217 |
| 2003/0135649 A1 * | 7/2003 | Buckley et al. | ............... | 709/247 |
| 2004/0207624 A1 * | 10/2004 | Saito et al. | ............... | 345/426 |
| 2006/0026513 A1 * | 2/2006 | Eschbach et al. | ............... | 715/526 |
| 2006/0088228 A1 * | 4/2006 | Marriott et al. | ............... | 382/305 |
| 2006/0103658 A1 * | 5/2006 | Liao | ............... | 345/545 |

OTHER PUBLICATIONS

Real—GPU, Lee et al. IEEE, 1-4244-0605-6, 2006, pp. 739-742.*

* cited by examiner

*Primary Examiner* — Jayesh A Patel
(74) *Attorney, Agent, or Firm* — Wong, Cabello, Lutsch, Rutherford & Brucculeri, L.L.P.

(57) ABSTRACT

Embodiments of the present invention provide a system for performing image conversion operations. The system starts by receiving a request from a client for one or more pixel buffers containing a pixel-formatted, cropped, geometrically transformed, and/or color matched version of an image representation. The system then determines if a provider can provide the one or more pixel buffers. If so, the system calls the provider to generate the one or more pixel buffers containing the pixel-formatted, cropped, geometrically transformed, and/or color matched version of the image representation. Otherwise, the system calls the provider to generate one or more intermediate pixel buffers, generates a sequence of converters for converting the one or more intermediate pixel buffers, and calls the sequence of converters to generate the one or more pixel buffers containing the pixel-formatted, cropped, geometrically transformed, and/or color matched version of the image representation.

33 Claims, 5 Drawing Sheets

METHOD AND APPARATUS FOR MANAGING IMAGE-PROCESSING OPERATIONS

BACKGROUND

1. Field of the Invention

Embodiments of the present invention relate to techniques for image-processing. More specifically, embodiments of the present invention relate to a method and apparatus for managing image-processing operations.

2. Related Art

Dramatic advances in computing technology have made it possible for computer systems to efficiently perform image-processing operations on large digital images. Such image-processing operations can involve: converting images from one file format to another, transforming images, or otherwise modifying the images. For example, an image can be converted from a frame of video encoded in an initial color space into a cropped and reduced-size still image encoded in a different color space.

Unfortunately, developers who want to process images often have to use a number of different graphics technologies (i.e., low-level image processing software) to perform the specific operations which are required to complete a given image-processing task. In the example described above, the developer may have to use one graphics technology to extract a frame from a video to produce a still image, while another graphics technology is used to convert the image between color spaces, and yet another graphics technology is used to transform the image.

Some developers have developed graphics technologies that provide large numbers of image-processing features so that developers are not forced to use multiple graphics technologies to perform a given image-processing task. These graphics technologies often perform certain types of image-processing operations well, but cannot perform other types of image-processing tasks because they do not support all the necessary operations. Furthermore, graphics technologies from different developers typically do not share a common interface. Hence, it can be difficult to automate image-processing tasks which require more than one graphics technology.

Another difficulty with using these graphics technologies relates to the promulgation of new image representation types and/or image-processing steps. If a developer wants to perform an operation that was not available when a graphics technology was released or if the developer wants to perform an existing operation on a new image representation type, the developer can be forced to rely on multiple graphics technologies.

Hence, what is needed is a system that provides mechanisms for processing images without the above-described problems.

SUMMARY

Embodiments of the present invention provide a system for performing image conversion operations. The system starts by receiving a request from a client for one or more pixel buffers containing a pixel-formatted, cropped, geometrically transformed, and/or color matched version of an image representation. The system then determines if a provider can provide the one or more pixel buffers with the pixel formatting, cropping, geometric transformation, and/or color matching from the image representation. If so, the system calls the provider to generate the one or more pixel buffers containing the pixel-formatted, cropped, geometrically transformed, and/or color matched version of the image representation. Otherwise, the system calls the provider to generate one or more intermediate pixel buffers, generates a sequence of converters for converting the one or more intermediate pixel buffers, and calls the sequence of converters to generate the one or more pixel buffers containing the pixel-formatted, cropped, geometrically transformed, and/or color matched version of the image representation.

In some embodiments, the image representation is a procedural image, a non-procedural image, a static image, an animated image, or another form of image representation, and the pixel buffer is a CPU buffer or a GPU buffer.

In some embodiments, the system receives a new image-provider or image-converter and a registration command for the new image-provider or image-converter. Next, the system registers the image-provider or image-converter. The system then uses the registered image-provider or image-converter for subsequent image conversions.

In some embodiments, before registering the image-provider or image-converter, the system compares the new image-provider or image-converter to a corresponding image-provider protocol or image-converter protocol. If the image-provider or image-converter does not correspond to the corresponding image-provider protocol or image-converter protocol, the system rejects the image-provider or image-converter.

In some embodiments, when receiving a request from a client, the system receives a request from an application or from an operating system.

Embodiments of the present invention provide a system for performing image conversion operations. The system starts by receiving a request from a client to generate an image in second representation from an image in a first representation. The system then determines if an exporter can generate the second image representation from the first image representation. If so, the system calls the exporter to generate the second image representation from the first image representation. Otherwise, the system determines if a provider can use the first image representation to generate one or more pixel buffers, from which an exporter can generate the second image representation. If so, the system calls the provider to generate the one or more pixel buffers and calls the exporter to generate the second image representation from the one or more pixel buffers. Otherwise, the system calls the provider to generate one or more intermediate pixel buffers, generates a sequence of converters for converting the one or more intermediate pixel buffers, calls the sequence of converters convert the one or more intermediate pixel buffers, and calls the exporter to generate the second image representation from the one or more pixel buffers.

In some embodiments, the first image representation is a procedural image, a non-procedural image, a static image, an animated image, or another form of image representation, and wherein the second image representation is a procedural image, a non-procedural image, a static image, an animated image, or another form of image representation.

In some embodiments, generating an image in a second representation from the image in the first representation involves performing pixel formatting, cropping, geometric transformation, and/or color matching on the image representation.

BRIEF DESCRIPTION OF THE FIGURES

Table 1 presents a listing of support classes within the QC Image System in accordance with embodiments of the present invention.

Table 2 presents a listing of default image providers within the QC Image System in accordance with embodiments of the present invention.

Table 3 presents a listing of default image converters within the QC Image System in accordance with embodiments of the present invention.

Table 4 presents a listing of default image exporters within the QC Image System in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), or solid-state devices, such as flash memory, or other volatile and non-volatile storage media.

Quartz Technologies Environment

Embodiments of the present invention leverage the Quartz Technologies graphics and windowing environment ("Quartz") distributed by Apple, Inc. of Cupertino, Calif. Hence, in the following sections, we refer to data types and applications that are part of Quartz.

Within Quartz, "Quartz 2D" is a two-dimensional drawing API that allows developers to achieve many visual effects (e.g., translucency and drop shadows), while "Quartz Composer" (QC) is a technology and development tool for processing and rendering graphical data. In addition, Core Image and Core Video support image-processing and video image manipulation, respectively. Quartz also provides low-level system services such as window buffering and composition, event handling and dispatch, display management, and text rendering.

Although we describe embodiments of the present invention that leverage Quartz, an alternative embodiment can function as a standalone system for managing image-processing operations using the same principles.

Computer System

Figure 1:
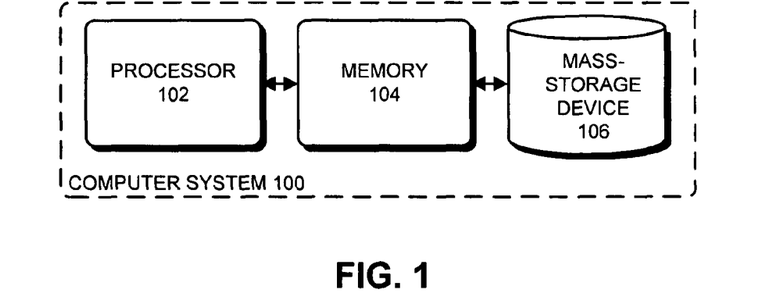
FIG. 1 presents a block diagram of a computer system in accordance with embodiments of the present invention.

FIG. 1 presents a block diagram of a computer system 100 in accordance with embodiments of the present invention. Computer system 100 includes processor 102, memory 104, and mass storage device 106. In some embodiments of the present invention, computer system 100 is a general-purpose computer that is used to manage the processing of images, image-based content, and image representations.

Processor 102 can be a central processing unit (CPU) that processes instructions for computer system 100. For example, processor 102 can be a microprocessor, a controller, an ASIC, or another type of computational engine. Memory 104 is volatile memory that stores instructions and data for processor 102. For example, memory 104 can be DRAM, SDRAM, or another form of volatile memory. Mass storage device 106 is a non-volatile storage device that stores instructions and data for processor 102. For example, mass storage device 106 can be a hard disk drive, a flash memory, an optical drive, or another non-volatile storage device.

Note that although we describe embodiments of the present invention using computer system 100, alternative embodiments can use other types of computing devices.

QC Image System

Figure 2:
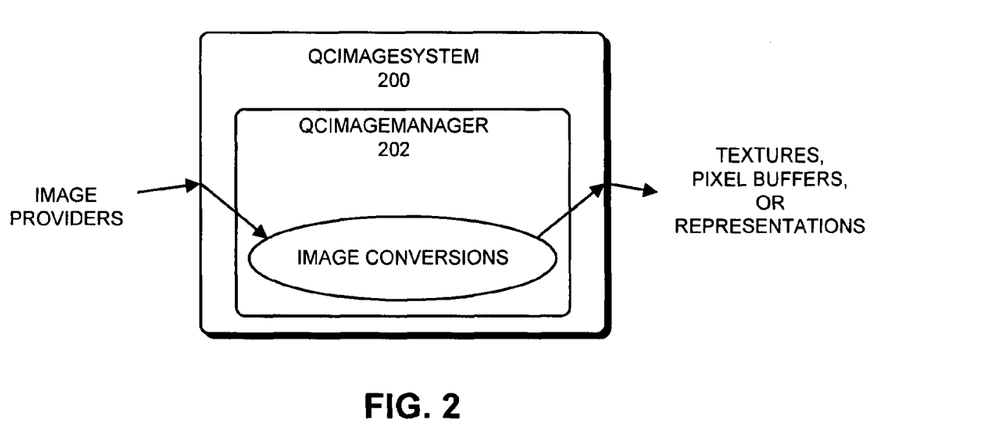
FIG. 2 presents a high-level block diagram of the QC Image System in accordance with embodiments of the present invention.

FIG. 2 presents a high-level block diagram of the QC Image System 200 in accordance with embodiments of the present invention. QC Image System 200 converts images for clients (e.g., the operating system and/or other applications) on computer system 100 (see FIG. 1). As shown in FIG. 2, QC Image System 200 accepts input images from image sources, performs conversions on the images, and then exports GPU buffers (e.g., OpenGL textures), or CPU buffers, and/or image representations of the converted images.

In some embodiments of the present invention, QC Image System 200 is incorporated with the operating system on computer system 100. In alternative embodiments, some or all of QC Image System 200 is incorporated with a standalone application that executes on computer system 100.

In some embodiments of the present invention, QCImageManager 202 handles buffer management, data conversion, uploads/downloads, and caching for QC Image System 200.

In some embodiments of the present invention, the image sources include graphics technologies or APIs such as Core Image (CI), Core Graphics (CG), Core Video (CV), Core Text (CT), NSImage, and/or any other graphics technologies or APIs that provide image representations to QC Image System 200.

In some embodiments of the present invention, the conversions can involve pixel format changes, cropping (including non-rectangular cropping), geometric transformations, and/or color matching. For example, an output image may be a cropped and rotated version of an original image in a different color space, a different pixel format (floating point or integer pixel components), or a different color model (RGB, CMYK, or intensity).

In some embodiments of the present invention, the output image representation types can include the image representation types used by: Core Image, Core Graphics, Core Video, and/or another graphics technology that accepts a predetermined image representation type.

If QC Image System 200 does not support a given input or export image representation type, QC Image System 200 can be configured to recognize the image representation type by adding providers and/or exporters (as described in more detail below). When adding providers and/or exporters, the provider or exporter must be registered with QC Image System 200. In order to register the new provider or exporter, the provider or exporter must conform to a corresponding protocol. In addition, if QC Image System 200 does not support a given image conversion, QC Image System 200 can be configured to support the conversion by adding a converter (as described in more detail below). When adding a converter, the converter must be registered with QC Image System 200. In order to register the new converter, the converter must conform to a corresponding protocol.

Figure 3:
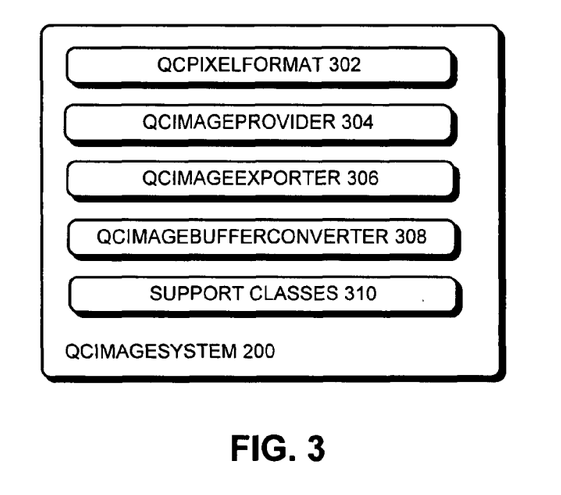
FIG. 3 presents a block diagram of the components of the QC Image System in accordance with embodiments of the present invention.

FIG. 3 presents a block diagram of the components of QC Image System 200 in accordance with embodiments of the present invention. QC Image System 200 includes extensible components QCPixelFormat 302, QCImageProvider 304, QCImageExporter 306, and QCImageBufferConverter 308. In addition, QC Image System 200 includes support classes 310.

QCPixelFormat 302 is a class that is used to describe pixel formats for images. For example, QCPixelFormat 302 can report the bit layout and/or the compatibility with various graphics APIs for a given image. QCImageProvider 304 and QCImageExporter 306 include a set of providers and exporters used to import and export images to and from QC Image System 200, respectively. QCImageBufferConverter 308 includes a set of converters used for image conversions.

Support Classes

Support classes 310 include the classes described in the following table.

TABLE 1

Support Classes within QC Image System

| | |
|---|---|
| QCImagePixelBuffer | Provides a buffer of pixels in RAM (i.e., for the CPU) |
| QCImageTextureBuffer | Provides a buffer of pixels in VRAM (i.e., for the GPU) |
| QCCGLContext | Wraps objects in the OpenGL context and provides added functionalities (e.g., retrieving information and creating shared contexts) |
| QCRegion | Describes the 2D domain of definitions of images |
| QCResource/QCResourcePool | Implements the resource pools mechanism |
| QCCache | Handles all caching operations |

QCImageProvider

In some embodiments of the present invention, QC Image System 200 includes a number of image providers (interchangeably called "providers"). Providers can be created from various source image representation types and can output buffers CPU buffers or GPU buffers or both. For example, given an image representation, a provider can output a GPU buffer which contains pixels generated from the image representation. When generating buffers, providers can perform cropping, geometric transform, and color matching operations.

In some embodiments, QC Image System 200 includes the default image providers listed in the following table.

TABLE 2

Default Image Providers

| | |
|---|---|
| CoreGraphics | Handles all image formats supported by ImageIO through URL, file path, or raw data, as well as CGImage, CGPath, CGLayer, and CGPDFDocument |

TABLE 2-continued

Default Image Providers

| | |
|---|---|
| CoreImage | Handles CIImage support |
| CoreText | Handles text rendering with simple attributes |
| CoreVideo | Handles CVImageBuffers support |
| NSImage | Handles NSImage and NSBitmapImageRep support |
| QCImageBuffer | Handles plain CPU or GPU buffers |

In addition to the default image providers, QC Image System 200 can be extended by registering new image providers. These new image providers are required to conform to the QCImageProvider 304 protocol for image providers within QC Image System 200. The following code section represents an embodiment of a QCImageProvider 304 protocol.

```
@protocol QCImageProvider
+ (BOOL) isCompatibleWithSource:(id)source
sourceMD5:(QCMD5*)md5; //If returning YES and md5 is not
NULL, you can set it to a MD5 representing the source for
caching purposes
+ (id<QCImageProvider>) createProviderWithSource:(id)source
options:(NSDictionary*)options;
- (QCMD5) providerMD5;
- (NSString*) sourceRepresentationType; //May be nil
- (id) sourceRepresentation; //Ignored if above is nil
- (QCRegion*) domainOfDefinition;
- (CGColor spaceRef) color space;
- (BOOL) hasAlpha;
- (QCPixelFormat*) nativePixelFormat; //May be nil, but if
not must be compatible with -color space
- (GLuint) nativeTextureTarget; //May be 0
- (BOOL) supportsCropping;
- (BOOL) supportsTransformation; //This requires cropping to
be supported
- (BOOL) supportsColorMatching; //This requires
transformation to be supported
- (NSArray*)
supportedPixelBufferFormatsForManager:(QCImageManager*)manager;
//NSArray of QCPixelFormats (nil = unsupported)
- (QCImagePixelBuffer*)
createPixelBufferForManager:(QCImageManager*)manager
withFormat:(QCPixelFormat*)format
transformation:(NSAffineTransform*)transformation
bounds:(NSRect)bounds color space:(CGColor spaceRef)color
space options:(NSDictionary*)options;
- (NSArray*)
supportedTextureBufferTargetsForManager:(QCImageManager*)manager;
//NSArray of NSNumbers (nil = unsupported)
- (NSArray*)
supportedTextureBufferFormatsForManager:(QCImageManager*)
manager; //NSArray of QCPixelFormats (nil = unsupported)
- (QCImageTextureBuffer*)
createTextureBufferForManager:(QCImageManager*)manager
withFormat:(QCPixelFormat*)format target:(GLenum)target
transformation:(NSAffineTransform*)transformation
bounds:(NSRect)bounds color space:(CGColor spaceRef)color
space options:(NSDictionary*)options;
@end
```

A provider implementation can be registered with QC Image System 200 using the following command:

```
+ (void) registerImageProviderClass:(Class)class.
```

In some embodiments of the present invention, a provider can be called by a client as well as by QC Image System 200. In these embodiments, the client can call the provider to get CPU or GPU buffers and pass them to QCImageManager 202.

QCImage

A QCImage is a wrapper around a QC Image Provider ("provider") that includes optional geometric transform and cropping operations. The QCImage is created by the provider to provide clients with a high level token that the can be moved between the clients and the components of QC Image System 200 (instead of moving the provider itself). In some embodiments, the QCImage includes metadata, which can be attached and retrieved by clients and components within the QC Image System.

```
@interface QCImage : QCObject
- (id) initWithProvider:(id<QCImageProvider>)provider
options:
(NSDictionary*)options;
- (id<QCImageProvider>) provider;
- (BOOL) isInfinite;
- (NSRect) bounds;
- (QCRegion*) domainOfDefinition;
- (NSAffineTransform*) transformation; //nil means identity
- (QCImagePixelBuffer*)
createPixelBufferForManager:(QCImageManager*)
manager withFormat:(QCPixelFormat*)format
bounds:(NSRect) bounds colorSpace:(CGColorSpaceRef)colorSpace
options:(NSDictionary*)options;
- (QCImageTextureBuffer*) createTextureBufferForManager:
(QCImageManager*)manager withFormat:(QCPixelFormat*)format
target:
(GLenum) target bounds:(NSRect)bounds
colorSpace:(CGColorSpaceRef) colorSpace
options:(NSDictionary*)options;
- (id) createRepresentationOfType:(NSString*)type
forManager:
(QCImageManager*)manager withOptions:(NSDictionary*)options;
- (id) initWithImage:(QCImage*)image; //Creates a virtual
copy and forwards metadata
- (QCImage*) createCroppedImageWithRect:(NSRect)rect;
- (QCImage*) createTranslatedImageByX:(CGFloat)dX
Y:(CGFloat)dY;
- (QCImage*) createScaledImageByX:(CGFloat)sX Y:(CGFloat) sY;
- (QCImage*) createScaledImageByX:(CGFloat)sX Y:(CGFloat) sY
fromX:
(CGFloat) oX Y:(CGFloat)oY;
- (QCImage*) createRotatedImageByDegrees:(CGFloat)r;
- (QCImage*) createRotatedImageByDegrees:(CGFloat)r
aroundX:(CGFloat) oX Y:(CGFloat)oY;
- (QCImage*)
createTransformedImage:(NSAffineTransform*)transformation;
- (void) setMetadata:(id)metadata forKey:(NSString*)key
shouldForward:
(BOOL)forward;
- (void) removeMetadataForKey:(NSString*)key;
- (void) removeAllMetadata;
- (id) metadataForKey:(NSString*)key;
- (void) forwardMetadataToObject:(QCObject*)object;
- (NSDictionary*) allMetadata;
- (NSDictionary*) allStaticMetadata;
- (NSDictionary*) allForwardedMetadata;
@end
```

The following call illustrates creating a QC Image from an unknown image representation type:

```
// from an unknown source (will scan all providers)
qcImage = [QCImage createImageWithSource:source options:nil]
```

In addition, some embodiments of the present invention allow the creation of a QCImage from image representations of a known type.

```
// from a file
qcImage = [[QCImage alloc] initWithFile:@"foo.jpg"
option:nil];
// or from CIImage
qcImage = [[QCImage alloc] initWithCIImage:ciImage
options:nil];
// from QCImageBuffer
qcImage = [[QCImage alloc] initWithQCImageBuffer:buffer
options:nil];
```

QCImageBufferConverter

In some embodiments of the present invention, QC Image System 200 includes a number of default image converters. These converters perform a number of different conversions on CPU and/or GPU buffers, such as pixel format conversion, cropping, geometric transforms, and color matching. For example, QC Image System 200 can include the converters listed in the following table.

TABLE 3

| Default Image Converters | |
|---|---|
| Basic | Handles conversions from RAM (CPU) to VRAM (GPU) (with optional cropping) |
| CoreGraphics | Handles geometry transformations and color matching on the CPU |
| CoreImage | Handles geometry transformations and color matching on the CPU and GPU |
| GLImage | Handles any pixel format conversion supported by the GLImageLib on the CPU |
| OpenGL | Handles geometry transformations on the GPU |
| XRGB | Handles optimized conversions from XRGB to ARGB |
| YUV422 | Handles optimized conversions from YUV422 to RGB (with optional cropping) |

In addition to the default image converters, QC Image System 200 can be extended by registering new converters. These new converters are required to conform to the QCImageBufferConverter 308 protocol for converters within QC Image System 200. The following code section represents an embodiment of the QCImageBufferConverter 308 protocol.

```
@protocol QCImageBufferConverter
+ (id) converterForImageManager:(QCImageManager*)manager;
//WARNING:Don't retain "manager"
- (BOOL) supportsCropping;
- (BOOL) supportsTransformation; //This requires cropping to
be supported
- (BOOL) supportsColorMatching; //This requires
transformation to be supported
- (NSArray*)
supportedPixelBufferFormatsForFormat:(QCPixelFormat*)format;
//NSArray of QCPixelFormats
- (QCImagePixelBuffer*)
createPixelBufferFromImageBuffer:(QCImageBuffer*)buffer
withFormat:(QCPixelFormat*)format
transformation:(NSAffineTransform*)transformation
bounds:(NSRect)bounds color space:(CGColor spaceRef)color
space options:(NSDictionary*)options;
- (NSArray*)
supportedTextureBufferFormatsForFormat:(QCPixelFormat*)format;
//NSArray of QCPixelFormats
- (QCImageTextureBuffer*)
createTextureBufferFromImageBuffer:(QCImageBuffer*)buffer
withFormat:(QCPixelFormat*)format target:(GLenum)target
transformation:(NSAffineTransform*)transformation
bounds:(NSRect)bounds color space:(CGColor spaceRef)color
space options:(NSDictionary*)options;
@end
```

A converter implementation can be registered with QC Image System 200 using a command, such as the following command:

```
+ (void) registerImageConverterClass:(Class)class
  priority:(double)p.
```

In some embodiments, QCImageManager 202 generates sequences of converters in order to make complex conversions. For example, assume a client requests an output image in color space B and with transformations C and D. Assuming that there are no converters that perform more than one of these conversions (e.g., a converter that can provide the image in color space B and with transformation D), QCImageManager 202 uses three separate converters to perform the image conversion. In cases such as this one, QCImageManager 202 determines which converters to use in which order to provide the output image taking into account performance and quality.

In some embodiments, when selecting a converter sequence to use to make a complex conversion, QCImageManager 202 models the performance of the possible converter sequences and the quality of the conversion from these converter sequences to determine the "cost" of using the path. QCImageManager 202 then uses the converter sequence with the lowest cost (i.e., the best performance and quality). During these determinations, performance can be determined by modeling the computational cost, speed, and number of transfers between CPU and GPU, while quality can be determined by modeling the number of pixel "touches" in the converter sequence.

QCImageExporter

In some embodiments of the present invention, QC Image System 200 includes a number of default image exporters. The image exporters generate an output image representation from a QCImage. For example, in some embodiments, QC Image System 200 includes the image exporters listed in the following table.

TABLE 4

| Default Image Exporters | |
| --- | --- |
| CoreGraphics | Handles exporting CGImages and image formats as raw data, a file, or a URL through ImageIO |
| CoreImage | Handles exporting CIImages |
| CoreVideo | Handles exporting CVPixelBuffers and CVOpenGLBuffers |
| NSImage | Handles exporting NSImages and NSBitmapImageReps |

In addition to the default exporters, QC Image System 200 can be extended by registering new exporters. These new exporters are required to conform to the QCImageExporter 306 protocol for converters within QC Image System 200. The following code section represents an embodiment of the QCImageExporter 306 protocol.

```
@protocol QCImageExporter
+ (id) exporterForImageManager:(QCImageManager*)manager;
- (NSArray*) supportedRepresentationTypes;
- (id) createRepresentationOfType:(NSStraing*)type
  withProvider:(id<QCImageProvider>)provider
  transformation:(NSAffineTransform*)transformation
  bounds:(NSRect)bounds color space:(CGColor spaceRef)color
  space options:(NSDictionary*)options;
@end
```

A exporter implementation can be registered with QC Image System 200 using a command, such as the following command:

```
+ (void) registerImageExporterClass:(Class)class.
```

The following call illustrates an exemplary call to export from a QCImage to another image representation type.

```
// Exporting a QCImage to a CGImage:
ciImage = [qcImage createRepresentationOfType:@"CGImage"
  forManager:manager withOption:nil];
```

In addition, some embodiments of the present invention allow the exportation of a QCImage to an image representation of a known type.

```
// Exporting a QCImage to a CGImage:
myImage = [qcImage createCGImageForManager:manager
  withOption:nil];
// Saving to disk:
myImage = [qcImage writeToFile:@"foo.jpg"].
```

In some embodiments of the present invention, the exporter can use an underlying image-processing library (or an image-processing application) to export the image for the client. For example, if a .JPG file is to be exported to a client, the exporter may call a method from a .JPG processing library.

QCImageManager

QCImageManager 202 handles buffer management, data conversion, uploads/downloads, and caching for QC Image System 200. The following code section represents an embodiment of QCImageManager 202.

```
@interface QCImageManager : NSObject
- (void) reclaimResources;
- (void) purgeResources;
//Creating a QCImage from an arbitrary source
- (QCImage*) createImageWithSource:(id)source
  options:(NSDictionary*)options;
//Retrieving image buffers and representations from
  providers
- (QCImagePixelBuffer*)
  createPixelBufferFromProvider:(id<QCImageProvider>)provider
  withFormat:(QCPixelFormat*)format
  transformation:(NSAffineTransform*)transformation
  bounds:(NSRect)bounds color space:(CGColor spaceRef)color
  space options:(NSDictionary*)options;
- (QCImageTextureBuffer*)
  createTextureBufferFromProvider:(id<QCImageProvider>)provider
  withFormat:(QCPixelFormat*)format target:(GLenum)target
  transformation:(NSAffineTransform*)transformation
  bounds:(NSRect)bounds color space:(CGColor spaceRef)color
  space options:(NSDictionary*)options;
- (id)
  createRepresentationFromProvider:(id<QCImageProvider>)provider
  ofType:(NSString*)type
  withOptions:(NSDictionary*)options;
```

-continued

```
//Returns an image buffer ready to be written into
- (QCImagePixelBuffer*)
createPixelBufferWithFormat:(QCPixelFormat*)format
pixelWide:(NSUInteger)width pixelsHigh:(NSUInteger)height
options:(NSDictionary*)options;
- (QCImageTextureBuffer*)
createTextureBufferWithFormat:(QCPixelFormat*)format
target:(GLenum)target pixelsWide:(NSUInteger)width
pixelsHigh:(NSUInteger)height
options:(NSDictionary*)options;
//Basic image buffer conversions
- (QCImagePixelBuffer*)
createPixelBufferFromImageBuffer:(QCImageBuffer*)buffer
sourceBounds:(NSRect)bounds options:(NSDictionary*)options;
//Pass NSZeroRect for entire buffer
- (QCImageTextureBuffer*)
createTextureBufferFromImageBuffer:(QCImageBuffer*)buffer
target:(GLenum)target sourceBounds:(NSRect)bounds
options:(NSDictionary*)options; //Pass NSZeroRect for entire
buffer and 0 for default target
//Complex image buffer conversions (through
QCImageBufferConverters)
- (QCImagePixelBuffer*)
createPixelBufferFromImageBuffer:(QCImageBuffer*)buffer
withFormat:(QCPixelFormat*)format
transformation:(NSAffineTransform*)transformation
bounds:(NSRect)bounds color space:(CGColor spaceRef)color
space options:(NSDictionary*)options; //Pass nil for default
format, nil for no transformation, NULL to preserve color
space and NSZeroRect to preserve bounds
- (QCImageTextureBuffer*)
createTextureBufferFromImageBuffer:(QCImageBuffer*)buffer
withFormat:(QCPixelFormat*)format target:(GLenum)target
transformation:(NSAffineTransform*)transformation
bounds:(NSRect)bounds color space:(CGColor spaceRef)color
space options:(NSDictionary*)options; //Pass nil for default
format, 0 for default target, nil for no transformation,
NULL to preserve color space and NSZeroRect to preserve
bounds
//Creating a flattened version of a QCImage
- (QCImage*) createFlattenedImage:(QCImage*)image
withFormat:(QCPixelFormat*)format color space:(CGColor
spaceRef)color space options:(NSDictionary*)options; //Pass
nil for default pixel format
@end
```

Interfaces

The following code sections represent embodiments of various interfaces for QC Image System 200. These interfaces facilitate registering provider classes, converter classes, and exporter classes with QC Image System 200. Note that each registered class must conform to the corresponding protocol. For example, a registered provider must correspond to the QCImageProvider 304 protocol (as described above).

```
@interface QCImage (ProviderRegistry)
+ (void) registerImageProviderClass:(Class)aClass; //Class
must conform to <QCImageProvider> protocol
+ (NSArray*) imageProviderClasses;
@end
@interface QCImage (ExporterRegistry)
+ (void) registerImageExporterClass:(Class)aClass; //Class
must conform to <QCImageExporter> protocol
+(NSArray*) imageExporterClasses;
@end
@interface QCImageManager (ConverterRegistry)
+ (void) registerImageBufferConverterClass:(Class)aClass
priority:(float)priority; //Class must conform to
<QCImageBufferConverter> protocol - The higher the priority
the better the chance to be used
+ (NSArray*) imageBufferConverterClasses;
@end
```

Processing Images

The following section presents processes for converting an image using QC Image System 200 in accordance with embodiments of the present invention. Note that although we present the steps in the following process in a particular order for the purposes of illustration, in alternative embodiments, the steps may occur in another order or one or more of the steps may be skipped.

Figure 4:
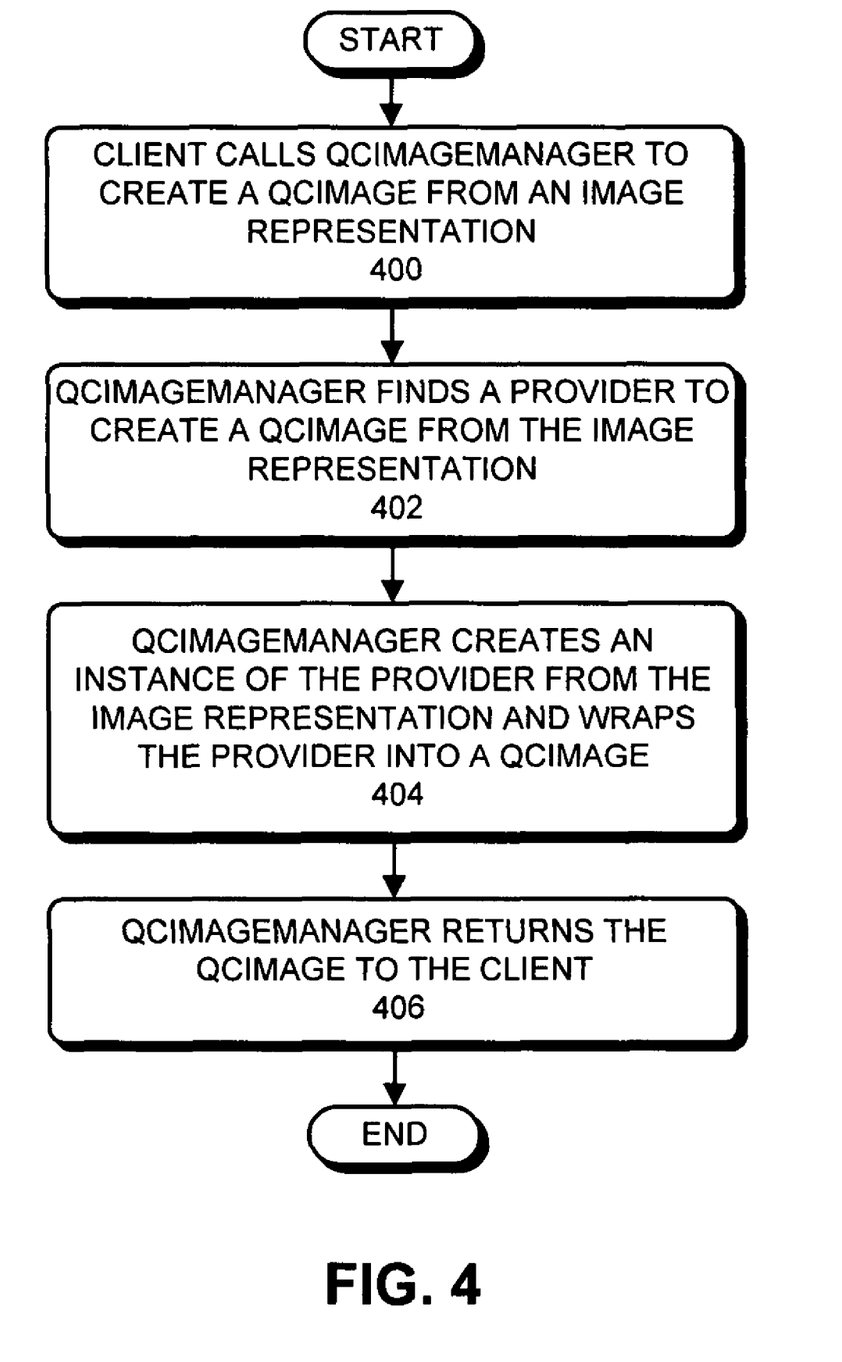
FIG. 4 presents a flowchart illustrating the process of creating a QCImage in accordance with embodiments of the present invention.

FIG. 4 presents a flowchart illustrating the process of creating a QCImage from an image representation in accordance with embodiments of the present invention. The QCImage is a high-level token that can subsequently be passed between the client and the components in QC Image System 200 during an image conversion process.

The process starts when a client calls QCImageManager 202 to create a QCImage from an image representation (step 400). For example, the client can call QCImageManager 202 to create a QCImage from a file on disk.

QCImageManager 202 then finds a provider to create a QCImage from the image representation (step 402). If there is no provider available that is capable of creating the QCImage from the image representation or if the request is erroneous, QCImageManager 202 signals the client that the operation failed.

Otherwise, QCImageManager 202 creates an instance of the provider from the image representation and wraps the provider into a QCImage (step 404). QCImageManager 202 then returns the QCImage to the client (step 406).

Note although we present the creation of the QCImage as a separate process from the following processes (i.e., the processes in FIGS. 5-7), in alternative embodiments, the process of generating a QCImage from the image representation is part of the processes. In other words, the client can call QCImageManager 202 once with an image representation and QCImageManager 202 can complete the process without passing the QCImage back to the client and requiring the client to make another call to QCImageManager 202.

Figure 5:
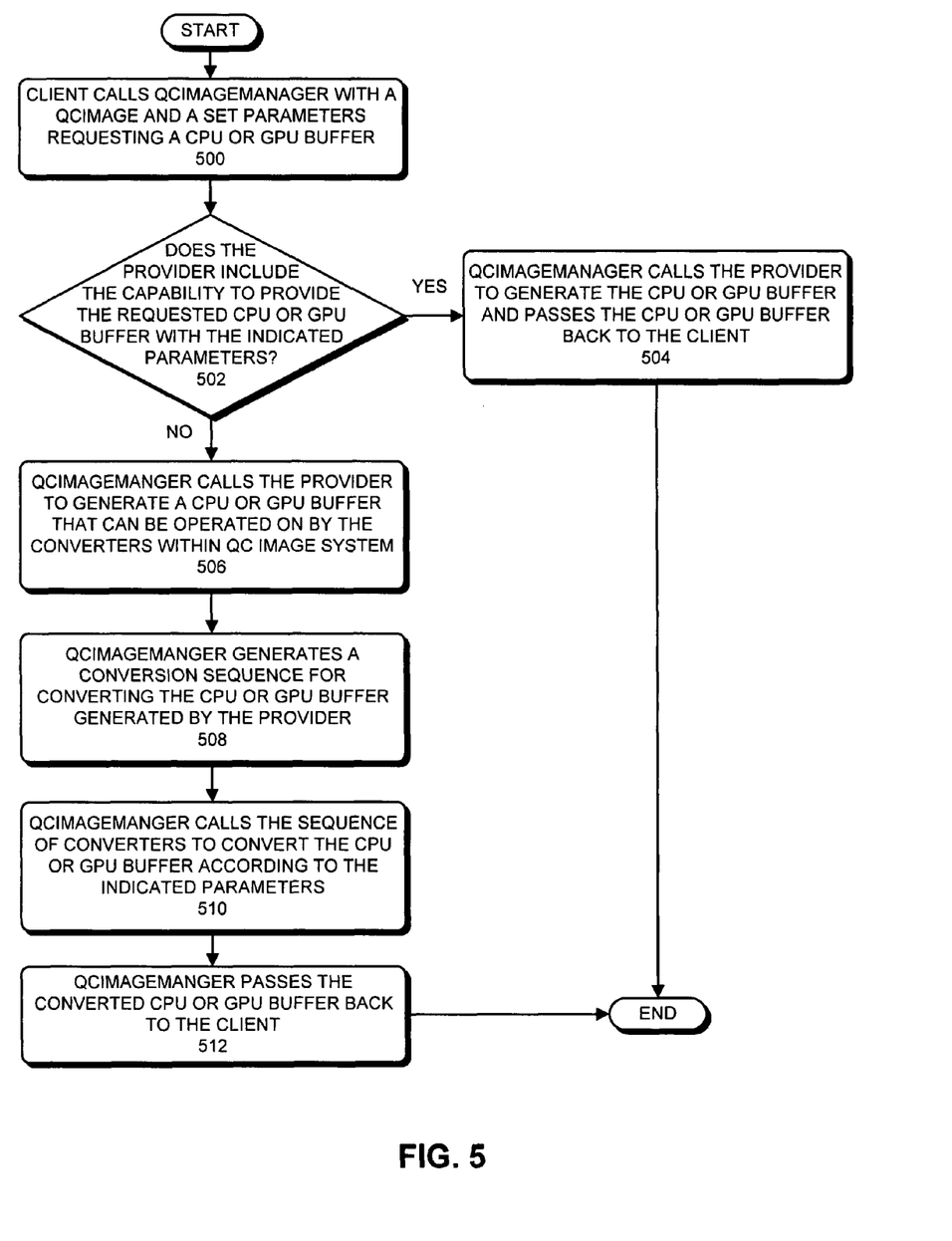
FIG. 5 presents a flowchart illustrating the process of creating a pixel buffer from an image representation in accordance with embodiments of the present invention.

FIG. 5 presents a flowchart illustrating the process of creating a pixel buffer from a QCImage in accordance with embodiments of the present invention. A pixel buffer can be any buffer in memory that contains a concrete representation of an image, however, for the purposes of illustration, we refer to a "CPU or GPU buffer."

The process starts when a client calls QCImageManager 202 with a QCImage and a set of parameters requesting a CPU or GPU buffer (step 500). For example, when requesting the CPU or GPU buffer, the client can request a buffer containing the pixels of the image representing the entire image or a sub-region of the image in a given pixel format and color space, and with an optional transformation applied (e.g., a rotation of 90 degrees).

QCImageManager 202 then determines if the provider wrapped within the QCImage includes the capability to provide the CPU or GPU buffer with the indicated parameters (step 502). If the provider includes the capability, then QCImageManager 202 calls the provider to generate the CPU or GPU buffer and passes the CPU or GPU buffer back to the client (step 504). Otherwise, if the provider does not include the capability, QCImageManager 202 calls the provider to generate a CPU or GPU buffer that can be operated on by converters within QC Image System 200 (step 506).

QCImageManager 202 then builds a converter sequence for converting the CPU or GPU buffer generated by the provider (step 508). QCImageManager 202 builds the converter sequence from the registered converters within QC Image System 200. Building the converter sequence can fail where the converter sequence is impossible to build (i.e., where the requested outcome is impossible to create, etc.) or where there is no registered converter that performs the operation. If QCImageManager 202 is unable to build the converter sequence, the image conversion process fails and an error message is sent to the client.

QCImageManager 202 then calls the sequence of converters to convert the CPU or GPU buffer according to the indicated parameters (step 510). Next, QCImageManager 202 passes the converted CPU or GPU buffer back to the client (step 512).

Figure 6A:
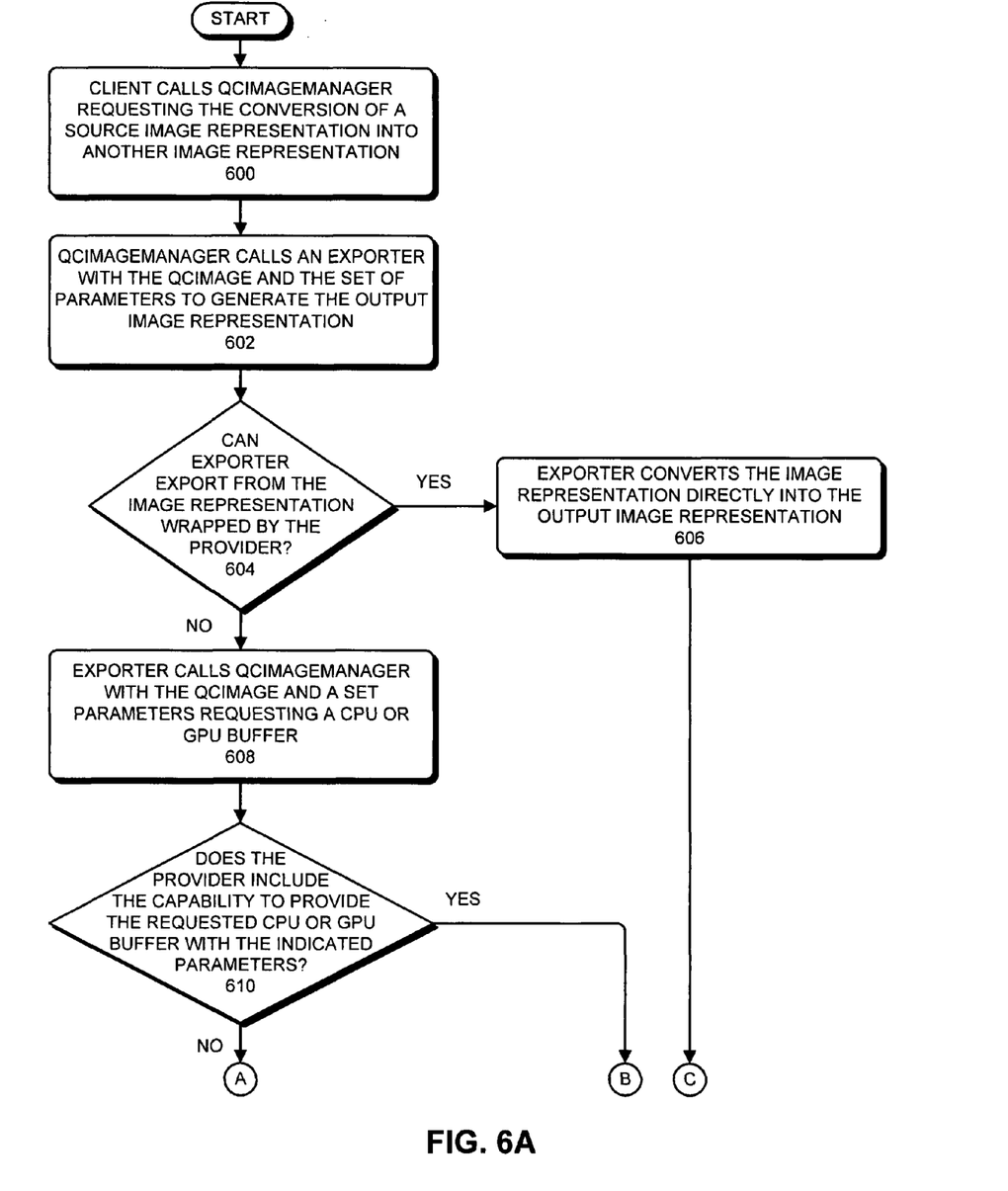
FIG. 6A through 6B present a flowchart illustrating the process of generating a second image representation from a first image representation in accordance with embodiments of the present invention.
Figure 6B:
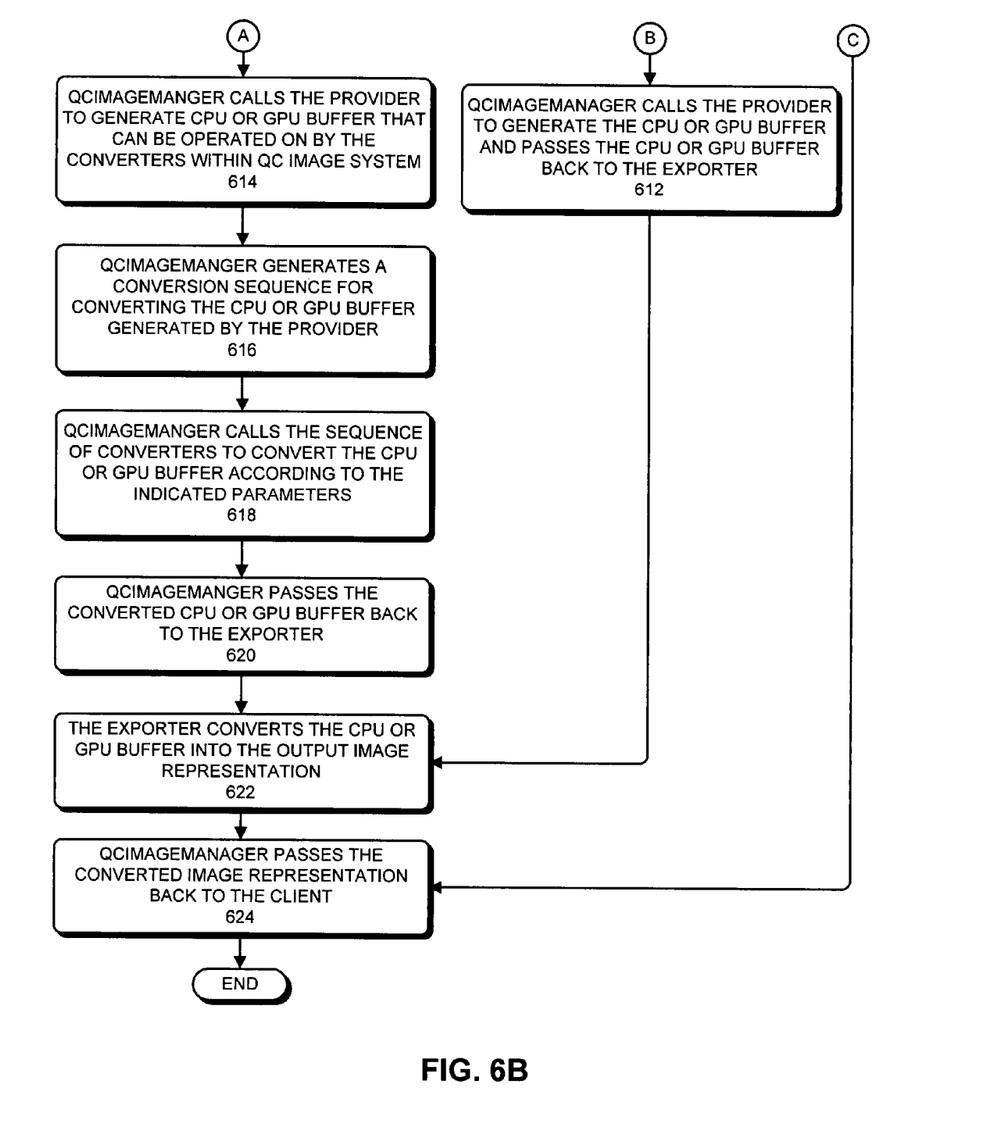

FIG. 6A through 6B present a flowchart illustrating the process of generating a second image representation from a first image representation in accordance with embodiments of the present invention. For the purposes of illustration, we call the first image representation the "source."

The process starts when a client calls QCImageManager 202 and requests the conversion of a source image representation into another type of image representation (step 600). For example, the client could request the conversion of an image representation type such as a frame of video into a still image. When calling QCImageManager 202, the client passes the QCImage and an (optional) set of parameters. Note that although the set of parameters is optional, we assume for the purposes of illustration that a set of parameters is passed to QCImageManager 202 by the client along with the QCImage.

QCImageManager 202 calls an exporter with the QCImage and the set of parameters to generate the output image representation (step 602). If there is no registered exporter that can generate the output image representation, the image conversion process fails and an error message is sent to the client.

QCImageManager 202 determines if the exporter can export from the image representation wrapped by the provider (step 604). For example, some exporters can generate the export image representation from the underlying source of the provider. If the exporter can export from the image representation, the exporter converts the image representation directly into the output image representation (step 606). Next, QCImageManager 202 passes the converted image representation back to the client (step 624).

Otherwise, if the exporter can not export from the image representation wrapped by the provider, the exporter calls back to QCImageManager 202 with the image representation and a set of parameters requesting a CPU or GPU buffers (step 608). For example, the exporter can request a CPU or GPU buffers containing the pixels of the image representing the entire image or a sub-region of the image in a given pixel format and color space and with an optional geometric transformation applied (for instance a rotation of 90 degrees). Note that the exporter could also request more than one CPU or GPU buffer, depending on the output file format.

QCImageManager 202 then determines if the provider wrapped within the QCImage includes the capability to provide the CPU or GPU buffers with the indicated parameters (step 610). If the provider includes the capability, then QCImageManager 202 calls the provider to generate the CPU or GPU buffer and passes the CPU or GPU buffer back to the exporter (step 612). Otherwise, if the provider does not include the capability, QCImageManager 202 calls the provider to generate a CPU or GPU buffer that can be operated on by converters within QC Image System 200 (step 614).

QCImageManager 202 then builds a converter sequence for converting the CPU or GPU buffer generated by the provider (step 616). QCImageManager 202 builds the converter sequence from the registered converters within QC Image System 200. Building the converter sequence can fail where the converter sequence is impossible to build (i.e., where the requested outcome is impossible to create, etc.) or where there is no registered converter that performs the operation. If QCImageManager 202 is unable to build the converter sequence, the image conversion process fails and an error message is sent to the client.

QCImageManager 202 then calls the sequence of converters to convert the CPU or GPU buffer according to the indicated parameters (step 618). Next, QCImageManager 202 passes the converted CPU or GPU buffer back to the exporter (step 620).

The exporter then converts the CPU or GPU buffer(s) into the output image representation (step 622). Next, QCImageManager 202 passes the converted image representation back to the client (step 624).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium containing instructions that when executed cause a computer to perform a method for image conversion, the method comprising:
   receiving a request from a client for one or more pixel buffers containing a version of an image representation that is at least one of pixel-formatted, cropped, geometrically transformed, or color matched;
   determining if a provider can provide the one or more pixel buffers with the pixel formatting, cropping, geometric transformation, or color matching from the image representation, wherein the provider is a component that outputs a pixel buffer generated from a predetermined source image representation type;
   if so, calling the provider to generate the one or more pixel buffers containing the pixel-formatted, cropped, geometrically transformed, or color matched version of the image representation; and
   otherwise, calling the provider to generate one or more intermediate pixel buffers, generating a sequence of converters for converting the one or more intermediate pixel buffers, and calling the sequence of converters to generate the one or more pixel buffers containing the pixel-formatted, cropped, geometrically transformed, or color matched version of the image representation, wherein a converter is a component that performs one or more conversions on a pixel buffer.

2. The non-transitory computer-readable storage medium of claim 1, wherein the image representation is a procedural image, a non-procedural image, a static image, an animated image, or another form of image representation, and the pixel buffer is a CPU buffer or a GPU buffer.

3. The non-transitory computer-readable storage medium of claim 1, wherein the method further comprises:
   receiving a new provider or converter and a registration command for the new provider or converter;
   registering the new provider or converter; and
   using the registered new provider or converter for subsequent image conversions.

4. The non-transitory computer-readable storage medium of claim 3, wherein the method further comprises:
   before registering the provider or converter, comparing the new provider or converter to a corresponding provider protocol or converter protocol; and rejecting the provider or converter if the provider or converter does not correspond to the corresponding provider protocol or converter protocol.

5. The non-transitory computer-readable storage medium of claim 1, wherein receiving a request from the client involves receiving a request from an application or from an operating system.

6. A non-transitory computer-readable storage medium containing instructions that when executed cause a computer to perform a method for image conversion, the method comprising:
   receiving a request from a client to generate an image in second representation from an image in a first representation;
   determining if an exporter can generate the second image representation from the first image representation, wherein an exporter is a component that generates an output image representation from a token created using the first image representation;
   if so, calling the exporter to generate the second image representation from the first image representation;
   otherwise, determining if a provider can use the first image representation to generate one or more pixel buffers, from which an exporter can generate the second image representation, wherein the provider is a component that outputs a pixel buffer generated from a predetermined source image representation type;
   if so, calling the provider to generate the one or more pixel buffers and calling the exporter to generate the second image representation from the one or more pixel buffers; and
   otherwise, calling the provider to generate one or more intermediate pixel buffers, generating a sequence of converters for converting the one or more intermediate pixel buffers, calling the sequence of converters convert the one or more intermediate pixel buffers, and calling the exporter to generate the second image representation from the one or more pixel buffers, wherein a converter is a component that performs one or more conversions on a pixel buffer.

7. The non-transitory computer-readable storage medium of claim 6, wherein generating an image in a second representation from the image in the first representation involves performing at least one of pixel formatting, cropping, geometric transformation, or color matching on the image representation.

8. The non-transitory computer-readable storage medium of claim 6, wherein the method further comprises:
   receiving a new provider, converter, or image-exporter, and a registration command for the new provider, converter, or image-exporter;
   registering the new provider, converter, or image-exporter; and
   using the registered new provider, converter, or image-exporter for subsequent image conversions.

9. The non-transitory computer-readable storage medium of claim 8, wherein the method further comprises:
   before registering the provider, converter, or image-exporter, comparing the new provider, converter, or image-exporter to a corresponding provider protocol, converter protocol, or image-exporter protocol; and
   rejecting the provider, converter, or image-exporter if the provider, converter, or image-exporter does not correspond to the corresponding provider protocol, converter protocol, or image-exporter protocol.

10. The non-transitory computer-readable storage medium of claim 6, wherein the first image representation is a procedural image, a non-procedural image, a static image, an animated image, or another form of image representation, and wherein the second image representation is a procedural image, a non-procedural image, a static image, an animated image, or another form of image representation.

11. The non-transitory computer-readable storage medium of claim 6, wherein receiving a request from the client involves receiving a request from an application or from an operating system.

12. An apparatus for performing image conversions, comprising:
   a processor;
   an execution mechanism in the processor;
   wherein the execution mechanism is configured to:
   receive a request from a client for one or more pixel buffers containing a version of an image representation that has been at least one of pixel-formatted, cropped, geometrically transformed, or color matched;
   determine if a provider can provide the one or more pixel buffers with the pixel formatting, cropping, geometric transformation, or color matching from the image representation, wherein the provider is a component that outputs a pixel buffer generated from a predetermined source image representation type;
   if so, call the provider to generate the one or more pixel buffers containing the pixel-formatted, cropped, geometrically transformed, or color matched version of the image representation; and
   otherwise, call the provider to generate one or more intermediate pixel buffers, generating a sequence of converters for converting the one or more intermediate pixel buffers, and calling the sequence of converters to generate the one or more pixel buffers containing the pixel-formatted, cropped, geometrically transformed, or color matched version of the image representation, wherein a converter is a component that performs one or more conversions on a pixel buffer.

13. The apparatus of claim 12, wherein the execution mechanism is configured so that the image representation is a procedural image, a non-procedural image, a static image, an animated image, or another form of image representation, and the pixel buffer is a CPU buffer or a GPU buffer.

14. The apparatus of claim 12, wherein the execution mechanism is configured to:
   receive a new provider or converter and a registration command for the new provider or converter;
   register the new provider or converter; and
   use the registered new provider or converter for subsequent image conversions.

15. The apparatus of claim 14, wherein the execution mechanism is configured to:
   before registering the provider or converter, compare the new provider or converter to a corresponding provider protocol or converter protocol; and
   reject the provider or converter if the provider or converter does not correspond to the corresponding provider protocol or converter protocol.

16. The apparatus of claim 12, wherein when receiving a request from the client, the execution mechanism is configured to receive a request from an application or from an operating system.

17. An apparatus for performing image conversions, comprising:
   a processor;
   an execution mechanism in the processor;
   wherein the execution mechanism is configured to:

receive a request from a client to generate an image in second representation from an image in a first representation;

determine if an exporter can generate the second image representation from the first image representation, wherein an exporter is a component that generates an output image representation from a token created using the first image representation;

if so, call the exporter to generate the second image representation from the first image representation;

otherwise, determine if a provider can use the first image representation to generate one or more pixel buffers, from which an exporter can generate the second image representation, wherein the provider is a component that outputs a pixel buffer generated from a predetermined source image representation type;

if so, call the provider to generate the one or more pixel buffers and calling the exporter to generate the second image representation from the one or more pixel buffers; and otherwise, call the provider to generate one or more intermediate pixel buffers, generate a sequence of converters for converting the one or more intermediate pixel buffers, call the sequence of converters convert the one or more intermediate pixel buffers, and call the exporter to generate the second image representation from the one or more pixel buffers, wherein a converter is a component that performs one or more conversions on a pixel buffer.

18. The apparatus of claim 17, wherein when generating an image in a second representation from the image in the first representation, the execution mechanism is configured to perform at least one of pixel formatting, cropping, geometric transformation, or color matching on the image representation.

19. The apparatus of claim 17, wherein the execution mechanism is configured to:
receive a new provider, converter, or image-exporter, and a registration command for the new provider, converter, or image-exporter;
register the new provider, converter, or image-exporter; and
use the registered new provider, converter, or image-exporter for subsequent image conversions.

20. The apparatus of claim 19, wherein the execution mechanism is configured to:
before registering the provider, converter, or image-exporter, compare the new provider, converter, or image-exporter to a corresponding provider protocol, converter protocol, or image-exporter protocol; and
reject the provider, converter, or image-exporter if the provider, converter, or image-exporter does not correspond to the corresponding provider protocol, converter protocol, or image-exporter protocol.

21. The apparatus of claim 17, wherein the execution mechanism is configured so that the first image representation is a procedural image, a non-procedural image, a static image, an animated image, or another form of image representation, and wherein the second image representation is a procedural image, a non-procedural image, a static image, an animated image, or another form of image representation.

22. The apparatus of claim 17, wherein when receiving a request from the client, the execution mechanism is configured to receive a request from an application or from an operating system.

23. A method for image conversion, comprising:
receiving a request from a client for one or more pixel buffers containing a version of an image representation that has been at least one of pixel-formatted, cropped, geometrically transformed, or color matched;

determining if a provider can provide the one or more pixel buffers with the pixel formatting, cropping, geometric transformation, or color matching from the image representation, wherein the provider is a component that outputs a pixel buffer generated from a predetermined source image representation type;

if so, calling the provider to generate the one or more pixel buffers containing the pixel-formatted, cropped, geometrically transformed, or color matched version of the image representation; and otherwise, calling the provider to generate one or more intermediate pixel buffers, generating a sequence of converters for converting the one or more intermediate pixel buffers, and calling the sequence of converters to generate the one or more pixel buffers containing the pixel-formatted, cropped, geometrically transformed, or color matched version of the image representation, wherein a converter is a component that performs one or more conversions on a pixel buffer.

24. The method of claim 23, wherein the image representation is a procedural image, a non-procedural image, a static image, an animated image, or another form of image representation, and the pixel buffer is a CPU buffer or a GPU buffer.

25. The method of claim 23, wherein the method further comprises:
receiving a new provider or converter and a registration command for the new provider or converter;
registering the new provider or converter; and
using the registered new provider or converter for subsequent image conversions.

26. The method of claim 25, wherein the method further comprises:
before registering the provider or converter, comparing the new provider or converter to a corresponding provider protocol or converter protocol; and
rejecting the provider or converter if the provider or converter does not correspond to the corresponding provider protocol or converter protocol.

27. The method of claim 23, wherein receiving a request from the client involves receiving a request from an application or from an operating system.

28. A method for image conversion, the method comprising:
receiving a request from a client to generate an image in second representation from an image in a first representation;

determining if an exporter can generate the second image representation from the first image representation, wherein an exporter is a component that generates an output image representation from a token created using the first image representation;

if so, calling the exporter to generate the second image representation from the first image representation;

otherwise, determining if a provider can use the first image representation to generate one or more pixel buffers, from which an exporter can generate the second image representation, wherein the provider is a component that outputs a pixel buffer generated from a predetermined source image representation type;

if so, calling the provider to generate the one or more pixel buffers and calling the exporter to generate the second image representation from the one or more pixel buffers; and otherwise, calling the provider to generate one or more intermediate pixel buffers, generating a sequence of converters for converting the one or more intermediate pixel buffers, calling the sequence of converters convert the one or more intermediate pixel buffers, and calling the exporter to generate the second image representation from the one or more pixel buffers, wherein a converter is a component that performs one or more conversions on a pixel buffer.

29. The method of claim 28, wherein generating an image in a second representation from the image in the first representation involves performing at least one of pixel formatting, cropping, geometric transformation, or color matching on the image representation.

30. The method of claim 28, wherein the method further comprises:
receiving a new provider, converter, or image-exporter, and a registration command for the new provider, converter, or image-exporter;
registering the new provider, converter, or image-exporter; and
using the registered new provider, converter, or image-exporter for subsequent image conversions.

31. The method of claim 30, wherein the method further comprises:
before registering the provider, converter, or image-exporter, comparing the new provider, converter, or image-exporter to a corresponding provider protocol, converter protocol, or image-exporter protocol; and
rejecting the provider, converter, or image-exporter if the provider, converter, or image-exporter does not correspond to the corresponding provider protocol, converter protocol, or image-exporter protocol.

32. The method of claim 28, wherein the first image representation is a procedural image, a non-procedural image, a static image, an animated image, or another form of image representation, and wherein the second image representation is a procedural image, a non-procedural image, a static image, an animated image, or another form of image representation.

33. The method of claim 28, wherein receiving a request from the client involves receiving a request from an application or from an operating system.

\* \* \* \* \*